J. P. HEDSTROM.
FEED FINGER FOR SAW SHARPENING MACHINES.
APPLICATION FILED FEB. 29, 1908.
984,669.
Patented Feb. 21, 1911.
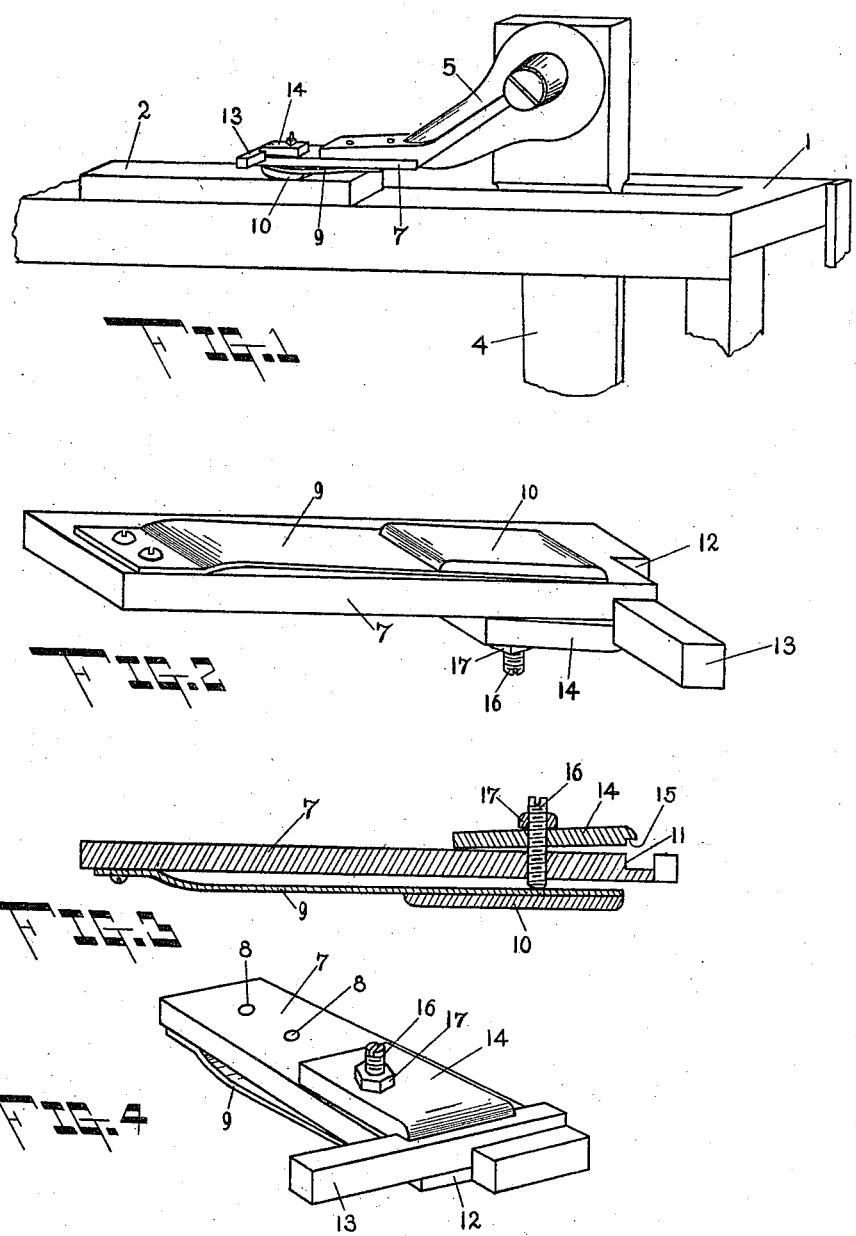
WITNESSES:
J. Ray Abbey
Ralph S. Warfield.
INVENTOR
John P. Hedstrom
BY
Geo. B. Willcox
ATTORNEY

UNITED STATES PATENT OFFICE.

JOHN P. HEDSTROM, OF BIG RAPIDS, MICHIGAN, ASSIGNOR TO HANCHETT SWAGE WORKS, OF BIG RAPIDS, MICHIGAN, A CORPORATION OF MICHIGAN.

FEED-FINGER FOR SAW-SHARPENING MACHINES.

984,669.  Specification of Letters Patent.  Patented Feb. 21, 1911.

Application filed February 29, 1908. Serial No. 418,608.

*To all whom it may concern:*

Be it known that I, JOHN P. HEDSTROM, a citizen of the United States, residing at Big Rapids, in the county of Mecosta and State of Michigan, have invented certain new and useful Improvements in Feed-Fingers for Saw-Sharpening Machines; and I do hereby declare the following to be a full, clear, and exact description of the invention, such as will enable others skilled in the art to which it appertains to make and use the same.

My invention relates to feed fingers for saw sharpening machines.

As is well-known in the art, saw filers have different preferences, some preferring to have the feed finger engage the saw tooth nearer the point than others.

One object of my invention is to provide means for quickly and easily regulating the height at which the feed finger shall engage the saw teeth.

Heretofore feed fingers have been formed of angular or L-shaped members bolted to the body-portion of the finger. The contact of the finger with the saw teeth soon wears away the finger and thereby prevents the finger from feeding the saw the required distance each time, besides rendering it imperative to substitute a new finger for the old one in a comparatively short time, entailing some expense.

Another object of my invention, therefore, is to provide a finger which will not quickly wear out, as well as one, the position of which can be shifted so that as soon as the wear has effected a considerable waste of material at one point the position of the finger can be easily and quickly changed to bring a new surface into engagement with the teeth of the saw. Furthermore, I have so altered the construction that the laterally-projecting portion alone of the finger can be replaced at a minimum expense without necessitating the loss of the entire finger, as was heretofore necessary. Also my improved finger can be attached to the machines now in use in place of the usual L-shaped finger referred to. The wearing away of the finger is occasioned not only by its engagement with the saw, but also by reason of the practically constant attrition of the emery from the sharpening saw.

My improved finger will permit of an adjustment up or down to suit any style of tooth or the preference of the operator.

To these and other ends, my invention consists in certain novel features and combinations of parts, such as will be more fully set forth hereinafter and particularly pointed out in the claims.

In the accompanying drawings, Figure 1 is a perspective view of a portion of a sharpening machine equipped with my invention; Fig. 2 is a bottom perspective view of the device removed from the machine; Fig. 3 is a view in cross-section, the feed finger being removed; and Fig. 4 is a perspective view.

As generally constructed, the customary machine employed for sharpening saws is provided with a table (1) having preferably a raised rib (2) formed at one edge thereof. A vertically-sliding sash or gate, not shown, carries a driven shaft, at one end of which is mounted a grinding wheel of emery, not shown, located above and extending substantially transversely of the rib (2). Located in approximate alinement with the rib is a vertically extending feed bar (4) oscillated in any suitable manner (not shown). Pivotally secured at one end to the feed bar above the table is an arm (5) of any approved pattern, but generally angular, as shown. This arm extends toward the rib (2), and to the free end of such arm is fastened the feed finger. The saw is held between the face of the table adjacent the rib by any suitable means, not shown. The mechanism of the machine is so timed that when the sash is slid upward to move the grinding wheel away from the saw, the feed bar is moved forwardly to cause the feed finger to engage one of the teeth of the saw to move the saw forward one step, the throw of the feed bar being regulated in any convenient manner. The feed finger is then drawn backward by the feed bar, the finger riding over the teeth owing to the pivotal connection of the arm (5) with the bar, and while the finger is moving rearwardly the sash is moved downwardly automatically to bring the grinding wheel into engagement with the succeeding tooth of the saw.

In former machines, no provision was made for causing the finger to engage any particular portion of the teeth of the saw and furthermore, as has been stated, the finger is subjected to considerable wear both because of its constant contact with the hardened teeth of the saw and also because of the constant presence of particles of emery from the grinding wheel, all of which made it necessary to replace the fingers at frequent intervals. The former feed finger was of a general L-shape bolted at its rear end to the free end of the arm, with its angle resting upon the rib (2) so that the laterally projecting portion of the finger would extend across and engage the teeth of the saw. They admitted of no adjustment either vertically or laterally so that the wear takes place at one point only and requires a constant adjustment of the throw of the feed bar in order to take up the wear of the finger so that the saw will be moved forward a predetermined distance each time. As soon as the finger becomes much worn it must be entirely discarded and a new one substituted therefor.

In my invention, I provide a feed finger comprising a plate (7) provided with apertures (8) (8) to permit it to be fastened to the free end of the feed arm (5) in the same manner as were the former feed fingers. To the bottom of this plate near its rear edge I preferably secure one end of a supporting strip (9), which may be resilient. This strip extends forwardly beneath the plate and in the present instance is bowed slightly, the free end of the strip being provided with a hardened steel shoe (10) on its under face, which shoe is adapted to ride upon the rib (2) or if no rib is employed, then upon the table. The plate preferably, though not necessarily, maintains a horizontal position owing to the shape of the angular arm (5) and at its free end is provided with a transverse groove (11), the outer wall of which at one end is cut away as at (12) for clearance purposes. Received within this groove is a rectangular finger (13) of self-hardening steel whose properties are well known, such steel being tough and hard and wear-resisting to a degree. This finger projects laterally from the plate (7) and is adapted to engage and feed the saw. The finger is of greater width than the depth of the groove and hence projects above the surface of the plate (7), for a purpose presently to be described. It is obvious that I may make the finger of either round or rectangular bar steel, and form the groove of a contour to receive the finger.

In order to retain the finger firmly in position in its seat (11), I preferably provide a clamping plate (14) mounted on the base plate or holder (7) near its free end, the forward edge of the clamping plate being recessed, as at (15), to overhang and engage the feed finger (13), the clamping plate preferably extending the entire width of the holder, and as one means for causing the clamping plate to tightly engage the finger, I provide a screw stud (16) passing through the clamping plate and through the holder, a lock nut (17) on the stud adapted to be screwed down tightly against the clamping plate, thereby retaining the feed finger in its groove (11). It is obvious that by loosening the lock nut the clamping plate may be loosened to admit of adjusting the feed finger either in or out laterally, over and over or end for end to bring new surfaces thereof into contact with the saw. In fact, there is an almost unlimited number of positions to which the finger can be adjusted before it need be replaced with another. It can be moved in or out until one face is worn, then turned over to present a new face which can be adjusted in or out and finally the finger can be reversed end for end and the entire gamut of positions run through again. The screw stud (16) also performs another function in addition to that of coöperating with the nut to retain the clamping plate in position. The stud passes through the holder (7) and its lower end engages the support (9). By screwing the stud in or out the finger and its holder are raised or lowered so as to bring the former against the tooth at the desired point.

It is evident that changes might be made in the form and arrangement of the several parts described without departing from the spirit and scope of my invention, and hence I do not wish to limit myself to the exact construction herein set forth.

Having thus fully disclosed my invention, what I claim as new is—

1. In a saw sharpening machine, the combination with a feed arm, of a holder secured thereto and having a seat formed therein, a feed finger received in the seat, a clamping plate mounted on the holder and engaging the feed finger, a threaded stud passing through the clamping plate and the holder, the lower end of the stud projecting below the holder, and a locknut on the stud adapted to take against the clamping plate.

2. In a saw sharpening machine the combination with a feed arm, of a holder secured thereto and having a seat formed therein, a feed finger received in the seat, a clamping plate mounted on the holder and engaging the feed finger, a threaded stud passing through the clamping plate and the holder, the lower end of the stud projecting below the holder, a lock nut on the stud adapted to take against the clamping plate, and a supporting member carried by and extending beneath the holder, the end of the stud engaging the supporting member to regulate the distance between the member and the holder.

In testimony whereof, I affix my signature in presence of two witnesses.

JOHN P. HEDSTROM.

Witnesses:
　RAY L. SWIFT,
　LOUIS B. HANCHETT.